Patented Apr. 18, 1950

2,504,732

UNITED STATES PATENT OFFICE 2,504,732

PREPARATION OF META-DIOXANES

Raphael Rosen, Elizabeth, and Erving Arundale, Westfield, N. J., assignors to Standard Oil Development Company, a corporation of Delaware No Drawing. Application May 5, 1948, Serial No. 25,308

4 Claims. (Cl. 260—338)

This invention relates to an improved process for the production of meta-dioxanes by the reaction of unsaturated compounds of the general formula:

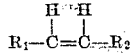

where $R_1$ and $R_2$ is hydrogen or a hydrocarbon radical such as alkyl, aryl, aralkyl, alkenyl, or alkaryl radical which may contain substituent groups such as alkoxy, alkoxy alkyl, or chloro groups with aldehydes, substituted aldehydes, or compounds capable of yielding aldehydes, in the presence of a catalyst comprising a dilute aqueous solution of boron trifluoride. This application is a continuation-in-part of Serial No. 372,017, filed December 27, 1940, now abandoned.

Meta-dioxanes have been prepared previously by reacting such compounds as aldehydes or ketones with 1,3-glycols or other polyhydric alcohols in the presence of an etherification catalyst. This reaction is carried out by heating substantially equal molecular proportions of the reactants at between 100° and 200° C. in the presence of a suitable catalyst. When prepared from glycols and aldehydes, the meta-dioxanes are quite expensive because of the cost of the starting materials.

Meta-dioxanes have also been prepared by condensing olefins with aldehydes in the presence of an acid-acting catalyst having an acid concentration of from 25% to 90%, as described in the application of J. J. Ritter, Serial No. 334,668, filed May 11, 1940, now Patent No. 2,362,307. Another method for the preparation of meta-dioxanes from primary or secondary olefins through their condensation with aldehydes is described by D. J. Loder in U. S. 2,158,031, issued May 9, 1939, and also in British 483,828 issued April 26, 1938. The process of the present invention is an improvement over previous methods for preparing meta-dioxanes.

The two patents mentioned above claim the condensation of olefins with aldehydes using a boron fluoride-water catalyst in which one mol of boron fluoride is associated with one to five mols of water. Catalysts of this concentration have now been found to be much too potent for the reaction of most unsaturated compounds with aldehydes. The reaction is so rapid as to be uncontrollable and large amounts of wide boiling by-products are obtained under these conditions. We have now discovered that boron fluoride-water catalysts containing about 6–18 (preferably 10–11) mols of water per mol of boron fluoride are distinctly advantageous in that they permit complete control of the reaction, produce a maximum of the desirable products, reduce the formation of wide boiling by-products, and even then permit a faster reaction than can be obtained with a dilute mineral acid catalyst of the same concentration on a weight basis.

According to the present invention, olefins, particularly the primary and secondary olefins, or compounds readily converted to the olefins, e. g., alcohols, alkyl halides, etc., or other unsaturated compounds, are condensed with aldehydes, thioaldehydes, substituted aldehydes, formals, acetals, or ketones in the presence of an aqueous boron fluoride catalyst in which the ratio of water to boron fluoride is between 6–18 (preferably 10–11) mols of water per mol of boron fluoride. The present invention, therefore, contemplates catalysts containing up to but never more than 39% boron fluoride on a weight basis. The boron fluoride may also be associated with water and mineral acids, e. g., $H_2SO_4$, HF, HCl, $H_3PO_4$, etc.

The reaction temperature ranges between 10° and 75° C. and the particular temperature employed depends on the olefin or unsaturated compound used and the boron fluoride-water catalyst concentration. A pressure at least equivalent to the vapor pressure of the reaction mixture at the temperature of the reaction should be maintained during the reaction. The reaction pressure will therefore vary from substantially atmospheric pressure to pressures of several atmospheres.

The reactants are preferably employed in the ratio of 2 mols of aldehyde to 1 of the mono-olefin or other unsaturated compound. Meta-dioxanes are colorless, mobile liquids completely soluble in ether and naphtha and boiling above 100° C. They may be used as solvents, as blending agents for motor fuels, and as intermediates for further chemical synthesis.

Compounds suitable as starting materials in this process include primary and secondary olefins (ethlyene, propylene, butene 1, butene-2, n-propylethylene, styrene, etc.), mixtures of olefins, mixtures of olefins and paraffins, secondary alcohols or halides (secondary butyl alcohol, secondary butyl chloride, etc.), unsaturated halides (allyl chloride), vinyl chloride, unsaturated ethers, diolefins, (butadiene, piperylene) olefin polymers, etc.

Aldehydes suitable for use in this process include paraformaldehyde, Formalin, trioxane, other polymers of formaldehyde, acetaldehyde, propionaldehyde, benzaldehyde, methoxy acetaldehyde, or compounds capable of decomposing under the reaction conditions to yield aldehydes, e. g., formals, acetals, hexamethylenetetramine, etc.

The general procedure, according to the present invention, is to charge a pressure vessel with the reactants and catalyst and to agitate the contents of the reactor for a length of time required for completion of the reaction. It is desired to use a pressure vessel equipped with means of agitation in order to insure adequate contact between the reactants and the catalyst. After the reaction is complete, the contents of the vessel are permitted to cool, excess olefin or gaseous products are bled off, and the mixture is then neutralized with an alkali such as sodium carbonate or sodium hydroxide. The neutralized mixture is then steam distilled. The distillate is treated with sodium chloride or a similar salt, the aqueous saline solution is separated from the upper layer, the latter is dried over potassium carbonate or other suitable desiccating salt, the dried liquid is separated from the salt by filtration, and the filtrate is fractionated in order to isolate the pure meta-dioxane, or pure substituted dioxane. The residue from the steam distillation step is cooled and filtered, and the water is removed from the filtrate by vacuum distillation. The vacuum distillation residue is mixed with an anhydrous solvent, such as absolute ethyl alcohol, any inorganic solids are separated from the solution by filtration, and the solvent is removed from the filtrate by vacuum distillation. The residue from the latter distillation contains the diol or substituted diol formed as a product or by-product in the condensation reaction. It may be purified by vacuum or atmospheric fractionation.

The reaction as carried out in a batch process has been described above. The process may, however, be carried out in a continuous manner by passing a mixture of an olefin, alcohol, or unsaturated compound through a packed reactor concurrent or countercurrent to an aldehyde solution containing a boron fluoride-water catalyst if necessary at elevated temperatures and removing the products as formed.

The following data are given for the purpose of illustrating the invention:

37% Formalin solution was placed in an Erlenmeyer flask and cooled in a wet ice bath. Boron fluoride gas was then bubbled in slowly with shaking and cooling until the proper catalyst concentration had been obtained. The contents of the flask were then transferred to a 2 liter stainless steel bomb, the bomb was closed, and inserted in an isopropyl alcohol-Dry Ice bath. The required quantity of propylene was then distilled into the bomb which was finally placed on an air shaker where it was shaken and heated at a temperature of 65–66° C. for 21½ hours. The bomb was then cooled and the excess propylene gas run off through a wet test meter. The product was removed from the bomb and neutralized with a 45% solution of sodium hydroxide whereupon it was steam distilled. The distillate which was taken overhead up to 109° C. was salted out with sodium chloride and the upper product layer separated, dried over anhydrous potassium carbonate, and finally fractionated with cuts being taken between 60–102° C. (isopropyl alcohol) and between 102–127° C. (4-methyl meta dioxane). The residue from the fractionation (above 127° C.) contained higher boiling formals. In addition, the residue from the steam distillation was extracted with absolute alcohol to remove inorganic salts, the extract was filtered, and the alcohol and residual water removed by distillation under vacuum. The residue containing still higher boiling formals and butylene glycols was finally weighed and the following data were obtained:

SUMMARY

*Propylene—formaldehyde condensations—aqueous boron fluoride catalyst*

General conditions:
  8 mols Formaldehyde
  22.7 mols Water
  5.4 mols Propylene

[Run for 21½ hours @ 65–66° C.]

| Run No. | Mols $BF_3$ | Mol Ratio Water/$BF_3$ | Excess Propylene recovered, liters | Grams 60–102° C. Cut | Grams 102–127° C. Cut | Grams above 127° C. | Grams Vacuum Distillation Residue |
|---|---|---|---|---|---|---|---|
| 1 [1] | 1.22 | 18.6/1 | 54 | 58.7 | 137.5 | 29.5 | 52.0 |
| 2 | 2.10 | 10.85/1 | 26 | 58.3 | 155.3 | 47.0 | 90.8 |
| 3 | 3.54 | 6.43/1 | 2.5 | 35.2 | 125.2 | 51.3 | 151.0 |
| 4 [2] | 9.6 | 2.37/1 | 0 | ←—— | —20— | ——→ | 295.0 |

[1] Some unreacted formaldehyde was present at the end of the run.
[2] The reaction was so exothermic that the bomb temperature increased from 28° C. to 65° C. in seven minutes without the application of heat.

The data given in the table indicate that at higher mol ratios of water/$BF_3$ above 18/1 the reaction is incomplete. However, under the same conditions but at catalyst ratios below 6/1, the reaction is not easily controlled, the yield of desired 4-methyl meta dioxane is low, and the yield of higher formals high. In other words, increasing the $BF_3$ catalyst concentration results in a reduced yield of meta dioxane and an increased yield of higher boiling products. There would appear to be a maximum dioxane yield around an 11/1 mol ratio of water/$BF_3$ at the particular operating temperature employed.

What is claimed is:

1. The process which comprises condensing an aldehyde with propylene at a temperature of between 65° C. and 75° C. under a pressure at least equal to the vapor pressure of the reaction mixture in the presence of an aqueous boron fluoride catalyst in which the ratio of water to boron fluoride is between 10 and 18 mols of water per mol of boron fluoride, and recovering the products of the reaction.

2. The process which comprises condensing formaldehyde with propylene at a temperature of between 65° C. and 75° C. under a pressure at least equal to the vapor pressure of the reaction mixture in the presence of an aqueous boron fluoride catalyst in which the ratio of water to boron fluoride is between 10 and 18 mols of water per mol of boron fluoride, and recovering the products of the reaction.

3. The process which comprises condensing formaldehyde with propylene at a temperature of about 65–66° C. under a pressure at least equal to the vapor pressure of the reaction mixture in the presence of an aqueous boron fluoride catalyst in which the ratio of water to boron fluoride is between 10 and 11 mols of water per mol of boron fluoride, and recovering the products of the reaction.

4. The process which comprises condensing formaldehyde with propylene in the ratio of 1.5 mols of formaldehyde per mol of propylene at 65–66° C. under a pressure at least equal to the vapor pressure of the reaction mixture in the presence of an aqueous boron fluoride catalyst in which the ratio of water to boron fluoride catalyst is between 10 and 11 mols of water per mol of boron fluoride, neutralizing the reaction mass with alkali, steam distilling the neutralized mass, drying the organic portion of the steam distillate, and fractionating the dried material in order to isolate 4-methyl meta-dioxane.

RAPHAEL ROSEN.
ERVING ARUNDALE.

REFERENCES CITED

The following references are of record in the file of this patent:

UNITED STATES PATENTS

| Number | Name | Date |
| --- | --- | --- |
| 2,158,031 | Loder | May 9, 1939 |